US012682624B2

(12) United States Patent
Chen et al.

(10) Patent No.: US 12,682,624 B2
(45) Date of Patent: Jul. 14, 2026

(54) IMAGE DATA PROCESSING METHOD, ELECTRONIC DEVICE, AND COMPUTER READABLE STORAGE MEDIUM USING NEURAL NETWORKS AND HOMOGRAPHY MATRIX

(71) Applicant: BEIJING HORIZON INFORMATION TECHNOLOGY CO., LTD., Beijing (CN)

(72) Inventors: Teng Chen, Beijing (CN); Wei Sui, Beijing (CN); Jiafeng Xie, Beijing (CN); Qian Zhang, Beijing (CN); Chang Huang, Beijing (CN)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 364 days.

(21) Appl. No.: 18/549,231

(22) PCT Filed: Sep. 14, 2022

(86) PCT No.: PCT/CN2022/118735
§ 371 (c)(1),
(2) Date: Sep. 6, 2023

(87) PCT Pub. No.: WO2023/082822
PCT Pub. Date: May 19, 2023

(65) Prior Publication Data
US 2024/0169712 A1     May 23, 2024

(30) Foreign Application Priority Data
Nov. 10, 2021     (CN) .......................... 202111329386.7

(51) Int. Cl.
*G06V 10/80* (2022.01)
*G06T 12/00* (2026.01)
(Continued)

(52) U.S. Cl.
CPC ............ *G06V 10/806* (2022.01); *G06T 12/00* (2026.01); *G06V 10/44* (2022.01); *G06V 10/82* (2022.01)

(58) Field of Classification Search
CPC ...... G06V 10/806; G06V 10/44; G06V 10/82; G06V 20/588; G06T 11/003;
(Continued)

(56) References Cited

U.S. PATENT DOCUMENTS 11,210,803 B2     12/2021   Ye et al.
11,568,653 B2 *   1/2023   Stein ..................... B60W 40/06
(Continued)

FOREIGN PATENT DOCUMENTS

CN     107689035 A     2/2018
CN     108416840 A     8/2018
(Continued)

OTHER PUBLICATIONS

X. Wang and H. Zhang, "Deep Monocular Visual Odometry for Ground Vehicle," in IEEE Access, vol. 8, pp. 175220-175229, 2020. (Year: 2020).*
(Continued)

*Primary Examiner* — Kathleen Y Dulaney
(74) *Attorney, Agent, or Firm* — K&L Gates LLP

(57)     ABSTRACT

Embodiments of this disclosure disclose an image data processing method and apparatus. The processing method includes: processing a first image and a second image by using a first neural network to obtain a homography matrix; determining a mapped image feature of a first image feature based on the homography matrix; fusing the mapped image feature and a second image feature to obtain a fused image feature; and processing the fused image feature by using a second neural network to obtain a first pixel height-to-depth ratio of the second image. In the embodiments of this
(Continued)

disclosure, a dense and accurate pixel height-to-depth ratio can be obtained, thereby facilitating 3D scene modeling.

20 Claims, 7 Drawing Sheets

(51) Int. Cl.
*G06V 10/44* (2022.01)
*G06V 10/82* (2022.01)

(58) Field of Classification Search
CPC . G06T 2207/20081; G06T 2207/20084; G06T 2207/30244; G06T 2207/30252; G06T 7/579; G06T 7/55; G06T 17/00; Y02T 10/40; G06F 18/253
USPC .................................. 382/190, 154; 701/300
See application file for complete search history.

(56) References Cited

U.S. PATENT DOCUMENTS

| | | | |
|---|---|---|---|
| 2019/0147621 A1 | 5/2019 | Alesiani et al. | |
| 2019/0325595 A1* | 10/2019 | Stein ........................ | G06T 7/55 |
| 2021/0350150 A1* | 11/2021 | An ........................ | G06N 3/0895 |
| 2022/0237866 A1* | 7/2022 | Stein ........................ | G06T 7/292 |
| 2024/0046409 A1* | 2/2024 | An ........................ | G06N 3/08 |

FOREIGN PATENT DOCUMENTS

| | | |
|---|---|---|
| CN | 110378250 A | 10/2019 |
| CN | 112634337 A | 4/2021 |
| CN | 113160294 A | 7/2021 |
| CN | 113379896 A | 9/2021 |
| CN | 113592706 A | 11/2021 |
| CN | 113592940 A | 11/2021 |
| CN | 113609888 A | 11/2021 |
| CN | 114049388 A | 2/2022 |
| EP | 3525131 A1 | 8/2019 |
| JP | 2021513173 A | 5/2021 |
| WO | 2021159594 A1 | 8/2021 |
| WO | 2023082822 A1 | 5/2023 |

OTHER PUBLICATIONS

H. U. Khan, A. Rafaqat Ali, A. Hassan, A. Ali, W. Kazmi and A. Zaheer, "Lane detection using lane boundary marker network with road geometry constraints," 2020 IEEE Winter Conference on Applications of Computer Vision (WACV), Snowmass, CO, USA, 2020, pp. 1823-1832. (Year: 2020).*

International Search Report and Written Opinion for International PCT Application No. PCT/CN2022/118735, dated Oct. 17, 2022.

Japanese Decision to grant from corresponding Japanese Patent Application No. 2023-553068, mailed on Sep. 3, 2024, and its English translation.

Extended European Search Report from corresponding European Patent Application No. 22891627.6, mailed on Jan. 16, 2025.

First Chinese office action from corresponding Chinese Patent Application No. 202111329386.7, mailed on Mar. 6, 2025 , and its English translation.

Detone et al., "Deep Image Homography Estimation", Jun. 12, 2016.

Chaney et al., "Learning Event-base Height from Plane and Parallax", 2019 IEEE/CVF Conference on Computer Vision and Pattern Recognition Workshops, Jun. 16, 2019, pp. 1634-1637.

Zhang et al., "Homography of UAV downward-looking ground images", Application Research of Computers, vol. 28, No. 2, Feb. 15, 2011, English Abstract Included.

* cited by examiner

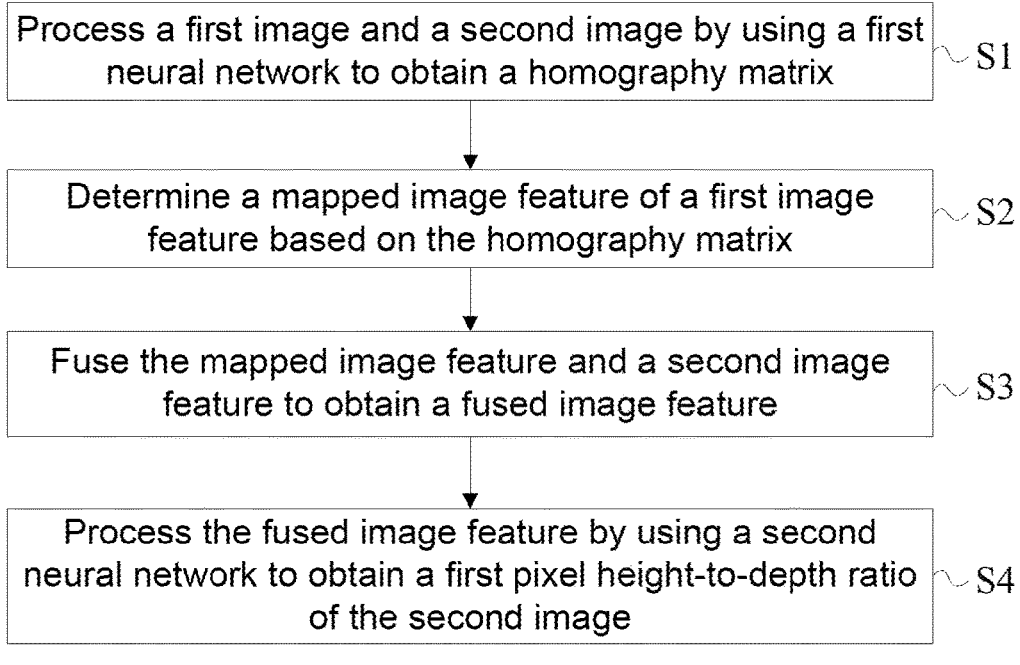

Process a first image and a second image by using a first neural network to obtain a homography matrix ~S1

Determine a mapped image feature of a first image feature based on the homography matrix ~S2

Fuse the mapped image feature and a second image feature to obtain a fused image feature ~S3

Process the fused image feature by using a second neural network to obtain a first pixel height-to-depth ratio of the second image ~S4

Fig.1

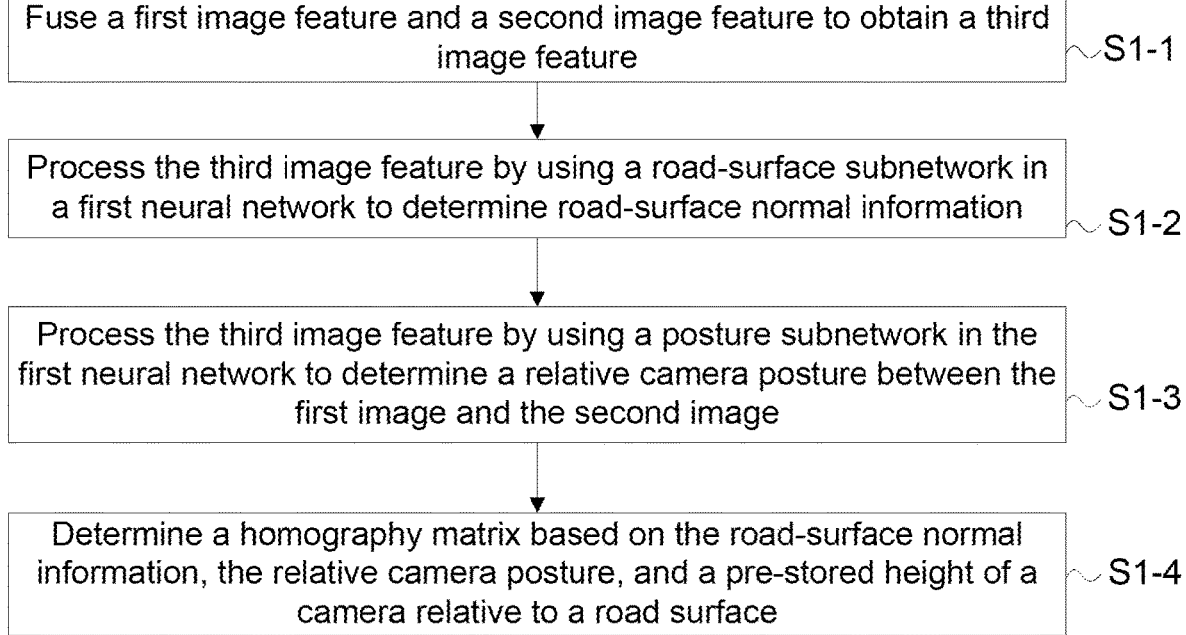

Fuse a first image feature and a second image feature to obtain a third image feature ~S1-1

Process the third image feature by using a road-surface subnetwork in a first neural network to determine road-surface normal information ~S1-2

Process the third image feature by using a posture subnetwork in the first neural network to determine a relative camera posture between the first image and the second image ~S1-3

Determine a homography matrix based on the road-surface normal information, the relative camera posture, and a pre-stored height of a camera relative to a road surface ~S1-4

Fig.2

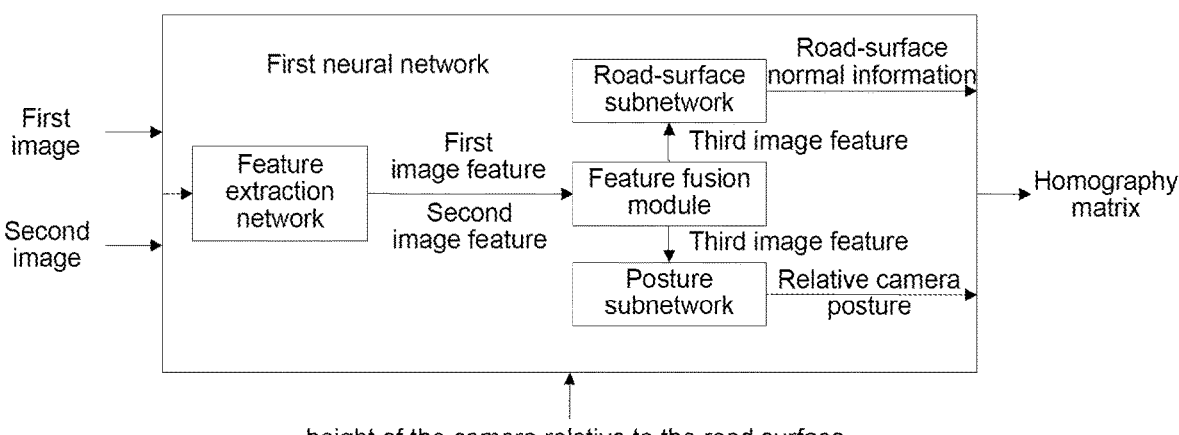

Fig.3

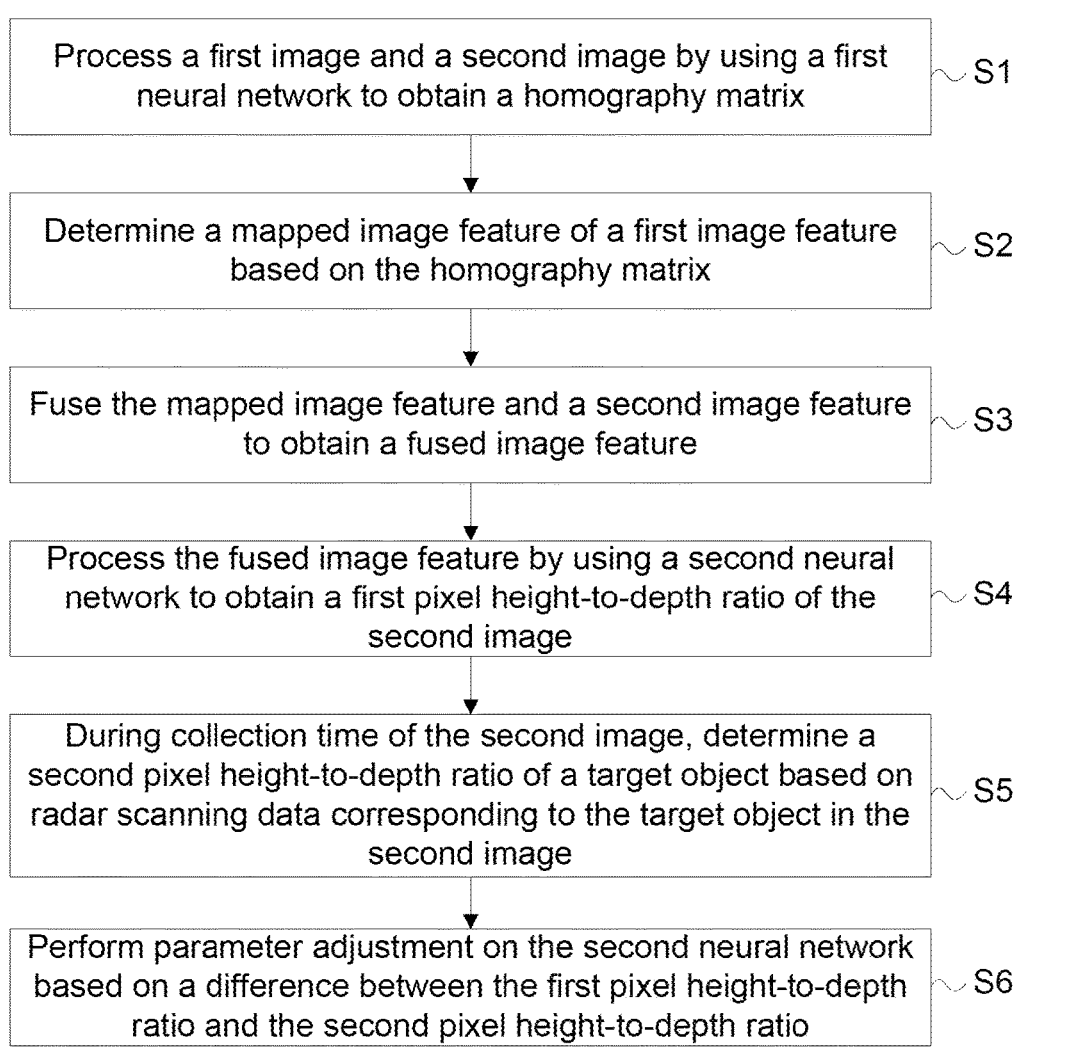

| | |
|---|---|
| Process a first image and a second image by using a first neural network to obtain a homography matrix | S1 |
| Determine a mapped image feature of a first image feature based on the homography matrix | S2 |
| Fuse the mapped image feature and a second image feature to obtain a fused image feature | S3 |
| Process the fused image feature by using a second neural network to obtain a first pixel height-to-depth ratio of the second image | S4 |
| During collection time of the second image, determine a second pixel height-to-depth ratio of a target object based on radar scanning data corresponding to the target object in the second image | S5 |
| Perform parameter adjustment on the second neural network based on a difference between the first pixel height-to-depth ratio and the second pixel height-to-depth ratio | S6 |

Fig.4

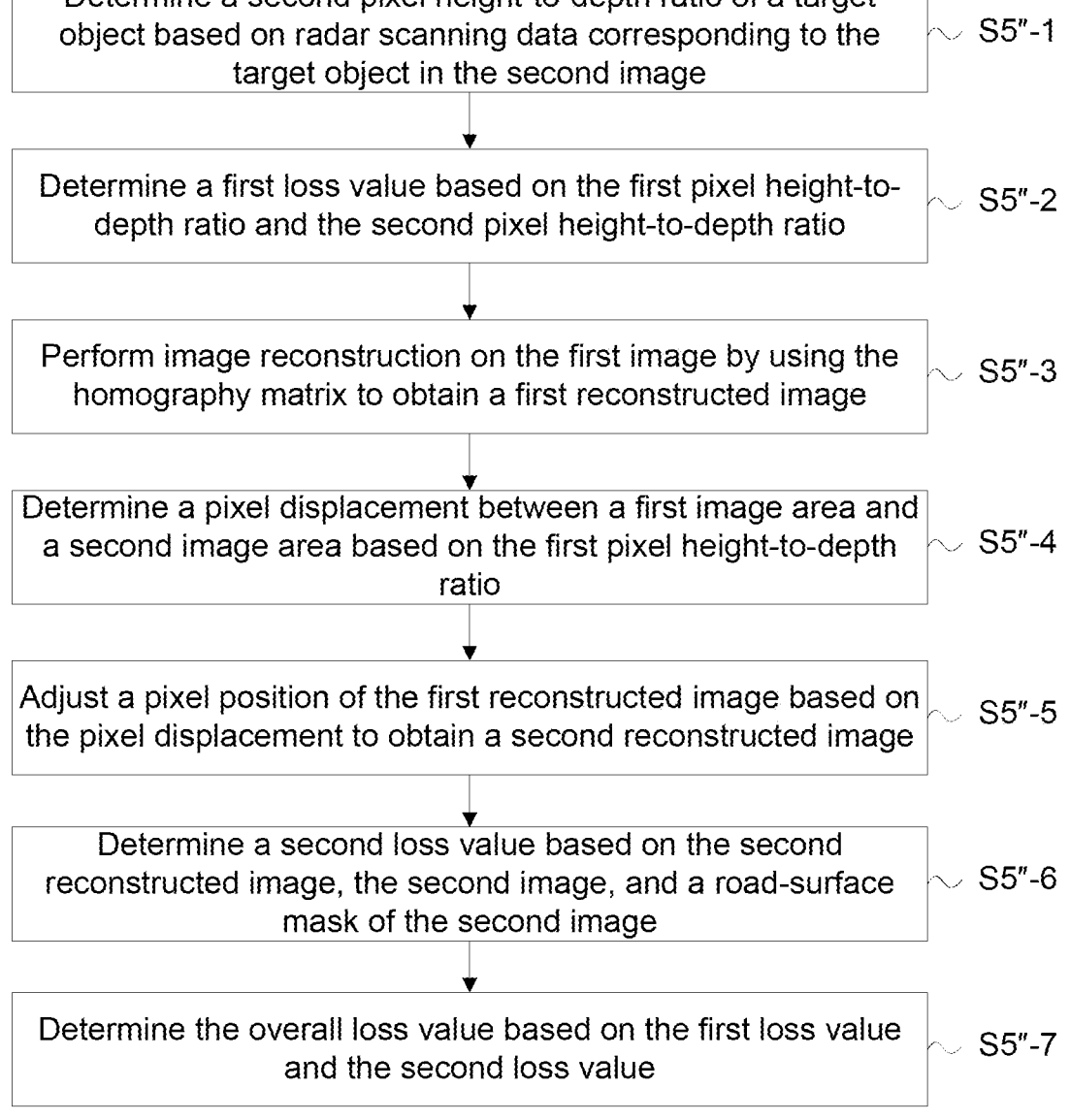

Determine a second pixel height-to-depth ratio of a target object based on radar scanning data corresponding to the target object in the second image    S5″-1

Determine a first loss value based on the first pixel height-to-depth ratio and the second pixel height-to-depth ratio    S5″-2

Perform image reconstruction on the first image by using the homography matrix to obtain a first reconstructed image    S5″-3

Determine a pixel displacement between a first image area and a second image area based on the first pixel height-to-depth ratio    S5″-4

Adjust a pixel position of the first reconstructed image based on the pixel displacement to obtain a second reconstructed image    S5″-5

Determine a second loss value based on the second reconstructed image, the second image, and a road-surface mask of the second image    S5″-6

Determine the overall loss value based on the first loss value and the second loss value    S5″-7

Fig.7

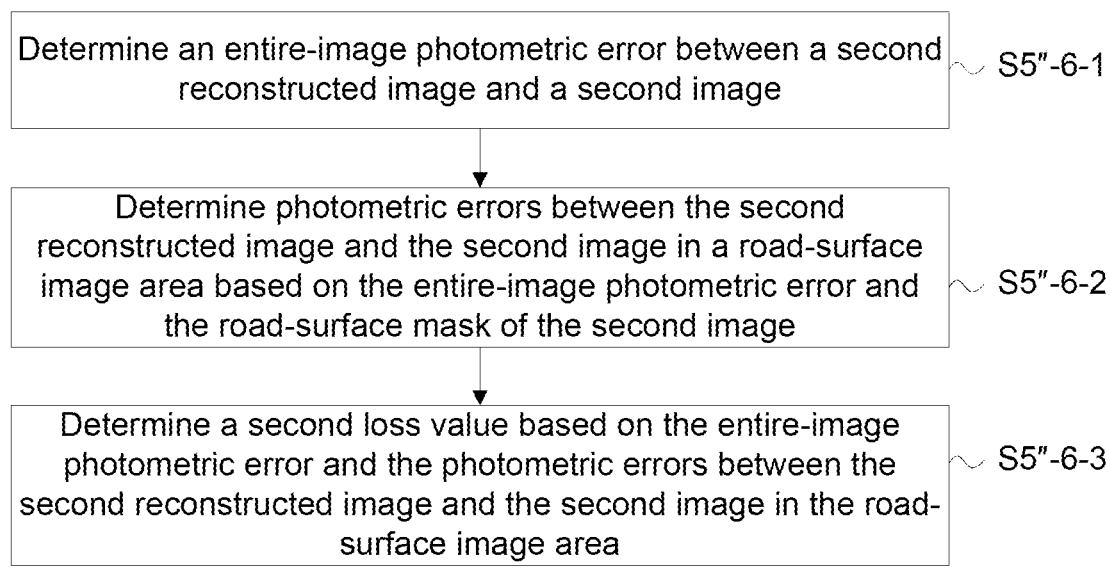

Determine an entire-image photometric error between a second reconstructed image and a second image ~ S5"-6-1

Determine photometric errors between the second reconstructed image and the second image in a road-surface image area based on the entire-image photometric error and the road-surface mask of the second image ~ S5"-6-2

Determine a second loss value based on the entire-image photometric error and the photometric errors between the second reconstructed image and the second image in the road-surface image area ~ S5"-6-3

Fig.8

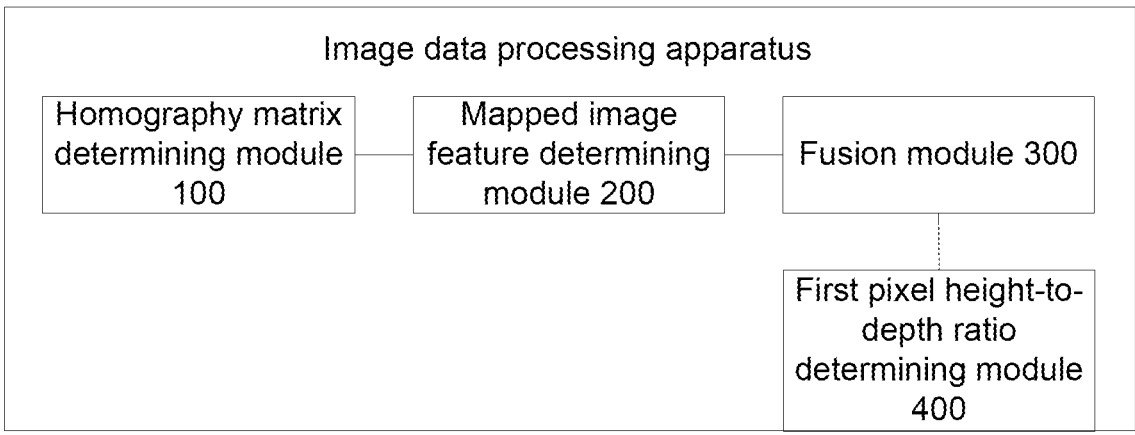

Image data processing apparatus

Homography matrix determining module 100

Mapped image feature determining module 200

Fusion module 300

First pixel height-to-depth ratio determining module 400

Fig.9

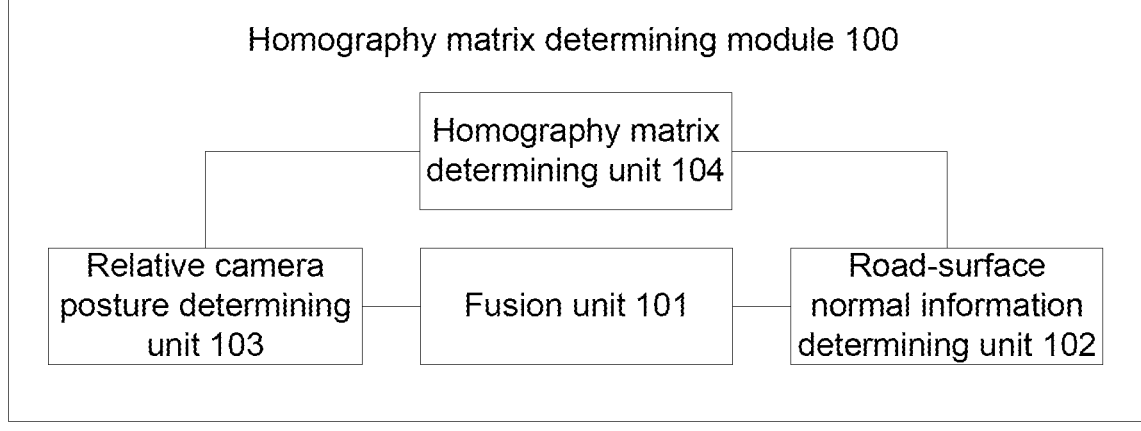

Homography matrix determining module 100

Homography matrix determining unit 104

Relative camera posture determining unit 103

Fusion unit 101

Road-surface normal information determining unit 102

IMAGE DATA PROCESSING METHOD, ELECTRONIC DEVICE, AND COMPUTER READABLE STORAGE MEDIUM USING NEURAL NETWORKS AND HOMOGRAPHY MATRIX

CROSS-REFERENCE TO RELATED APPLICATIONS

This application is a U.S. National Stage Entry under 35 U.S.C. § 371 of International Patent Application No. PCT/CN2022/118735, entitled "IMAGE DATA PROCESSING METHOD AND APPARATUS", filed Sep. 14, 2022, which claims priority to Chinese patent application No. 202111329386.7, filed on Nov. 10, 2021 and entitled "IMAGE DATA PROCESSING METHOD AND APPARATUS", which is incorporated herein by references in its entirety.

This application claims priority to Chinese patent application No. 202111329386.7, filed on Nov. 10, 2021 and entitled "IMAGE DATA PROCESSING METHOD AND APPARATUS", which is incorporated herein by references in its entirety.

FIELD OF THE INVENTION

This disclosure relates to the technical field of image processing, and in particular, to an image data processing method and apparatus.

BACKGROUND OF THE INVENTION

A plane parallax method is to model a 3D scene based on a difference between two visual angles observing a same object or scene. This method relies on a particular plane and can restore a height from a pixel point in the scene to the plane and a distance from the pixel point to an observation point, that is, a pixel height-to-depth ratio of the pixel point.

A current plane parallax method relies on optical flow estimation to obtain matching results of corresponding points in two visual angles. An optical flow method cannot obtain a dense estimation result and is greatly affected by noise. How to obtain a dense and accurate pixel height-to-depth ratio based on image data is a problem that needs to be urgently resolved.

SUMMARY OF THE INVENTION

To resolve the foregoing technical problem, this disclosure is proposed.

According to a first aspect of an embodiment of this disclose, an image data processing method is provided, including:

processing a first image and a second image by using a first neural network to obtain a homography matrix, wherein the first image is captured at a first moment, the second image is captured at a second moment, and the first image and the second image have road-surface elements in a same area;

determining a mapped image feature of a first image feature based on the homography matrix, wherein the first image feature is a feature extracted based on the first image;

fusing the mapped image feature and a second image feature to obtain a fused image feature, wherein the second image feature is a feature extracted based on the second image; and

processing the fused image feature by using a second neural network to obtain a first pixel height-to-depth ratio of the second image.

According to a second aspect of an embodiment of this disclose, an image data processing apparatus is provided, including:

a homography matrix determining module, configured to process a first image and a second image by using a first neural network to obtain a homography matrix, wherein the first image is captured at a first moment, the second image is captured at a second moment, and the first image and the second image have road-surface elements in a same area;

a mapped image feature determining module, configured to determine a mapped image feature of a first image feature based on the homography matrix, wherein the first image feature is a feature extracted based on the first image;

a fusion module, configured to fuse the mapped image feature and a second image feature to obtain a fused image feature, wherein the second image feature is a feature extracted based on the second image; and a first pixel height-to-depth ratio determining module, configured to process the fused image feature by using a second neural network to obtain a first pixel height-to-depth ratio of the second image.

According to a third aspect of an embodiment of this disclose, a computer readable storage medium is provided, wherein the computer readable storage medium stores a computer program, and the computer program is used for implementing the image data processing method according to the first aspect.

According to a fourth aspect of an embodiment of this disclosure, an electronic device is provided, wherein the electronic device includes:

a processor; and a memory, configured to store processor-executable instructions, wherein the processor is configured to read the executable instructions from the memory, and execute the instructions to implement the image data processing method according to the first aspect.

Based on the image data processing method and apparatus provided in the foregoing embodiments of this disclosure, the first image and the second image that are captured by a camera and have road-surface elements in a common area are processed by using the first neural network to obtain the homography matrix; subsequently, the first image feature is mapped based on the homography matrix to obtain the mapped image feature; the mapped image feature and the second image feature are fused to obtain the fused image feature; and the fused image feature is processed by using the second neural network to determine the first pixel height-to-depth ratio. The first pixel height-to-depth ratio is a ratio of a height of a pixel of a target object in the second image, which is relative to a road surface, to a pixel depth. This ratio can be used for 3D scene modeling. According to the image data processing method in the embodiments of this disclosure, a dense and accurate pixel height-to-depth ratio can be obtained based on image data, thereby facilitating the 3D scene modeling.

The technical solutions of this disclosure are further described below in detail with reference to the accompanying drawings and the embodiments.

BRIEF DESCRIPTION OF THE DRAWINGS

By describing the embodiments of this disclosure more detailed with reference to the accompanying drawings, the foregoing and other objectives, features, and advantages of this disclosure will become more apparent. The accompanying drawings are used to provide further understanding of the embodiments of this disclosure, constitute a part of the specification, and are used to explain this disclosure together with the embodiments of this disclosure, but do not constitute limitation to this disclosure. In the accompanying drawings, the same reference numerals generally represent the same components or steps.

FIG. 1 is a schematic flowchart of an image data processing method according to an embodiment of this disclosure;

FIG. 2 is a schematic flowchart of step S1 according to an embodiment of this disclosure;

FIG. 3 is a diagram of an operating principle of a first neural network according to an example of this disclosure;

FIG. 4 is a schematic flowchart of an image data processing method according to another embodiment of this disclosure;

FIG. 7 is a schematic flowchart of step S5" according to an embodiment of this disclosure;

FIG. 8 is a schematic flowchart of step S5"-6 according to an embodiment of this disclosure;

FIG. 9 is a structural block diagram of an image data processing apparatus according to an embodiment of this disclosure;

FIG. 10 is a structural block diagram of a homography matrix determining module 100 according to an embodiment of this disclosure;

DETAILED DESCRIPTION OF THE EMBODIMENTS

Figure 5:
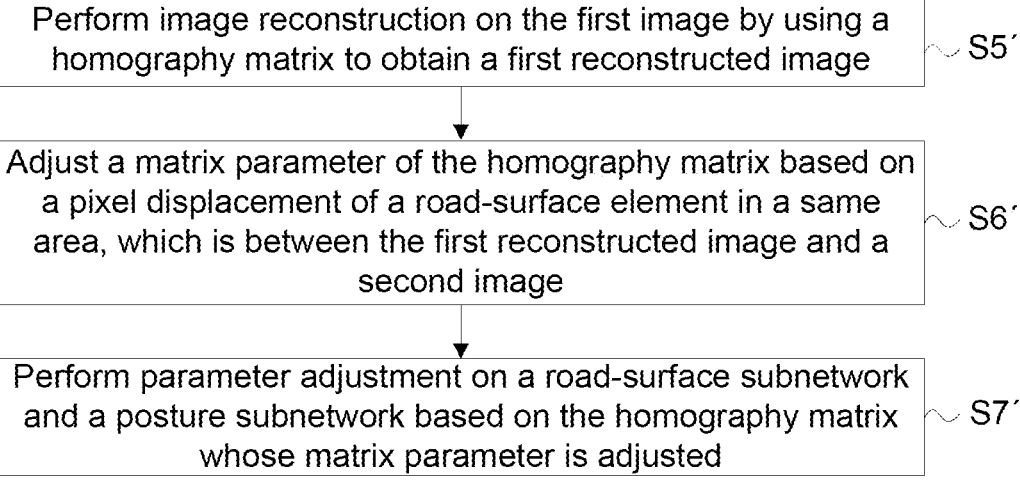
FIG. 5 is a schematic flowchart after step S4 according to still another embodiment of this disclosure.

Exemplary embodiments of this disclosure are described below in detail with reference to the accompanying drawings. Obviously, the described embodiments are merely a part, rather than all of embodiments of this disclosure. It should be understood that this disclosure is not limited by the exemplary embodiments described herein.

It should be noted that unless otherwise specified, the scope of this disclosure is not limited by relative arrangement, numeric expressions, and numerical values of components and steps described in these embodiments.

A person skilled in the art may understand that terms such as "first" and "second" in the embodiments of this disclosure are merely configured to distinguish between different steps, devices, or modules, and indicate neither any particular technical meaning, nor necessarily logical ordering among them.

It should be further understood that, in the embodiments of this disclosure, the term "multiple"/"a plurality of" may refer to two or more; and the term "at least one" may refer to one, two, or more.

It should be further understood that, any component, data, or structure involved in the embodiments of this disclosure can be generally construed to one or more, unless clearly stated or the context indicates otherwise.

In addition, the term "and/or" in this disclosure refers to only an association relationship that describes associated objects, indicating presence of three relationships. For example, A and/or B may indicate presence of three cases: A alone, both A and B, and B alone. In addition, the character "/" in this disclosure generally indicates an "or" relationship of associated objects before and after the character "/".

It should be further understood that, the descriptions of the various embodiments of this disclosure focus on differences among the various embodiments. The same or similar parts among the embodiments may refer to one another. For concision, description is not repeated.

Descriptions of at least one exemplary embodiment below are actually illustrative only, and never serve as any limitation to this disclosure along with application or use thereof.

Technologies, methods, and devices known by a person of ordinary skills in the art may not be discussed in detail herein. However, where appropriate, the technologies, the methods, and the devices shall be regarded as a part of the specification.

It should be noted that, similar signs and letters in the following accompanying drawings indicate similar items. Therefore, once a certain item is defined in one of the accompanying drawings, there is no need to further discuss the item in the subsequent accompanying drawings.

The embodiments of this disclosure can be applicable to a terminal device, a computer system, a server, and other electronic devices, which can be operated together with numerous other general-purpose or special-purpose computing system environments or configurations. Well-known examples of a terminal device, a computing system, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems.

The electronic device such as a terminal device, a computer system, or a server can be described in general context of computer system-executable instructions (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task is performed by a remote processing device linked through a communications network. In the distributed cloud computing environment, the program module may be located on a storage medium of a local or remote computing system including a storage device.

Exemplary Method

FIG. 1 is a schematic flowchart of an image data processing method according to an embodiment of this disclosure.

This embodiment can be applied to a server. As shown in FIG. 1, the method includes the following steps.

S1, process a first image and a second image by using a first neural network to obtain a homography matrix, wherein the first image is captured at a first moment, the second image is captured at a second moment, and the first image and the second image have road-surface elements in a same area.

Specifically, a camera is disposed on a vehicle, and intrinsic parameters and external parameters of the camera are preset. During driving of the vehicle, images are captured by using the camera.

The first image captured at a first moment by the same camera and the second image captured at a second moment by the camera are obtained. Images may be captured by means of video capturing, or a plurality of frames of images may be captured by capturing images at intervals. In this embodiment, the first moment and the second moment can be separated by M frames, where M is an integer greater than 0.

Because a road surface is usually included in an image captured in a driving scene, the road surface in the first image and the second image is used as a reference plane required by a plane parallax method in this embodiment.

Feature extraction is performed on the first image by using a feature extraction network to obtain a first image feature, and feature extraction is performed on the second image by using the feature extraction network to obtain a second image feature. The feature extraction network may be a first neural network, or may be a network independent of the first neural network. In this embodiment, the feature extraction is performed in a same downsampling manner. For example, downsampling is performed on the first image with an original dimension of 3\*h\*w (h and w respectively represent a width and a length of the image), to obtain a first feature image with a dimension of n\*h'\*w' to serve as the first image feature. Moreover, downsampling is performed on the second image with an original dimension of 3\*h\*w, to obtain a second feature image with a dimension of n\*h'\*w' to serve as the second image feature, where n represents a quantity of channels, h' can be ⅓₂ or ¹⁄₆₄ of h, and w' is ⅓₂ or ¹⁄₆₄ of w. Values of h' and w' can be the same or different.

The first image feature and the second image feature are processed by using the first neural network, to obtain the homography matrix used for aligning the road surfaces in the first image and the second image. For example, a calculation method of the homography matrix is as follows:

$$H = K * \left( R - \frac{N * t}{d} \right) * K^{-1},$$

where H represents the homography matrix, such as, a matrix with elements of 3×3; K represents the intrinsic parameter of the camera, and $K^{-1}$ represents an inverse matrix of K; d represents a height of the camera relative to the road surface, and d can be obtained through calibration; R and t respectively represent a relative rotation matrix (for example, 3×3) and a relative translation matrix (for example, 1×3) of a camera that are between the first image and the second image; and N represents a road-surface normal.

S2, determine a mapped image feature of a first image feature based on the homography matrix.

Specifically, the first image feature is mapped to a visual angle of the second image feature by using the homography matrix, to obtain the mapped image feature. A dimension of the mapped image feature is the same as those of the first image feature and the second image feature. According to the example in step S1, the dimension of the mapped image feature is n\*h'\*w'.

S3, fuse the mapped image feature and a second image feature to obtain a fused image feature.

In an optional manner, the mapped image feature and the second image feature are superimposed according to a channel dimension to obtain the fused image feature. According to the examples in steps S1 and S2, a dimension of the fused image feature is 2n\*h'\*w'.

S4, process the fused image feature by using a second neural network to obtain a first pixel height-to-depth ratio of the second image.

Specifically, the second neural network is a pre-trained model, such as a deep learning model. The second neural network can predict a pixel height-to-depth ratio based on the fused image feature. In this embodiment, the pixel height-to-depth ratio predicted for the fused image feature by the second neural network is used as the first pixel height-to-depth ratio.

In this embodiment, the first image and the second image that are captured by the camera and have road-surface elements in a common area are processed by using the first neural network to obtain the homography matrix. Subsequently, the first image feature is mapped by means of the homography matrix to obtain the mapped image feature. The mapped image feature and the second image feature are fused to obtain the fused image feature. The fused image feature is processed by using the second neural network to determine the first pixel height-to-depth ratio. The first pixel height-to-depth ratio is a ratio of a height of a pixel of a target object in the second image, which is relative to the road surface, to a pixel depth. This ratio can be used for 3D scene modeling. According to the image data processing method in this embodiment of this disclosure, a dense and accurate pixel height-to-depth ratio can be obtained based on image data, thereby facilitating the 3D scene modeling.

FIG. 2 is a schematic flowchart of step S1 according to an embodiment of this disclosure. As shown in FIG. 2, in this embodiment, step S1 includes the following steps.

S1-1, fuse the first image feature and the second image feature to obtain a third image feature.

FIG. 3 is a diagram of an operating principle of a first neural network according to an example of this disclosure. As shown in FIG. 3, in this example, the feature extraction network is the first neural network. After extracting the first image feature and the second image feature, the feature extraction network inputs the first image feature and the second image feature to a feature fusion module for fusion. The feature fusion module can superimpose the first image feature and the second image feature according to a channel dimension to obtain the fused image feature. For example, when the dimension of the first image feature is n\*h'w' and the dimension of the second image feature is n\*h'w', a dimension of the third image feature is 2n\*h'\*w'.

S1-2, process the third image feature by using a road-surface subnetwork in the first neural network to determine road-surface normal information.

Refer to FIG. 3 again, the feature fusion module inputs the third image feature to the road-surface subnetwork, and the road-surface subnetwork predicts based on the third image feature and outputs the road-surface normal information. The road-surface subnetwork is a network model that predicts based on an input image feature with a road-surface feature and outputs the road-surface normal information. In this embodiment, the road-surface normal information can be represented by a road-surface equation of $N=[n_X, n_Y, n_Z]$, where $n_X$, $n_Y$, and $n_Z$ represent three-dimensional coordinates in a road coordinate system.

S1-3, process the third image feature by using a posture subnetwork in the first neural network to determine a relative camera posture between the first image and the second image.

Refer to FIG. 3 again, the feature fusion module inputs the third image feature to the posture subnetwork, and the posture subnetwork predicts based on the third image feature and outputs the relative camera posture. The posture subnetwork is a network model that predicts based on the input image feature and outputs the relative camera posture. In this embodiment, the relative camera posture includes the relative rotation matrix and the relative translation matrix of the camera.

S1-4, determine the homography matrix based on the road-surface normal information, the relative camera posture, and a pre-stored height of a camera relative to a road surface.

Refer to FIG. 3 again, the first neural network can determine, based on the height of the camera relative to the road surface, the road-surface normal information, and the relative camera posture, the homography matrix by using the calculation method for the homography matrix that is described above. It should be noted that the height of the camera relative to the road surface, the road-surface normal information, and the relative camera posture can be output by the first neural network, and then the homography matrix is determined by another module except the first neural network.

In this embodiment, the third image feature obtained by the fusion is processed by using the road-surface subnetwork and the posture subnetwork in the first neural network, respectively. For example, the third image feature obtained by superimposing the first image feature and the second image feature on the channel dimension can be processed by using the road-surface subnetwork and the posture subnetwork, to obtain the road-surface normal information and the relative camera posture. The homography matrix can be accurately determined based on the road-surface normal information, the relative camera posture, and the pre-stored height of the camera relative to the road surface.

FIG. 4 is a schematic flowchart of an image data processing method according to another embodiment of this disclosure. As shown in FIG. 4, in this embodiment, after step S4, the following steps are further included.

S5, during collection time of the second image, determine a second pixel height-to-depth ratio of a target object based on radar scanning data corresponding to the target object in the second image.

Specifically, the vehicle is provided with an in-vehicle radar. A collection moment of the second image is $t_2$, and radar scanning data near the vehicle at the moment $t_2$ is obtained by using the in-vehicle radar. The second image and the radar scanning data near the vehicle are analyzed, so that the radar scanning data corresponding to the target object can be extracted from the radar scanning data near the vehicle based on an analysis result. A position of the target object relative to the vehicle and a volume of the target object can be accurately obtained based on the extracted radar scanning data, so that a true value of a pixel height-to-depth ratio at the moment $t_2$ can be generated, which is recorded as the second pixel height-to-depth ratio.

S6, perform parameter adjustment on the second neural network based on a difference between the first pixel height-to-depth ratio and the second pixel height-to-depth ratio.

Specifically, based on the difference between the true value of the pixel height-to-depth ratio (that is, the second pixel height-to-depth ratio) and a predicted value of the pixel height-to-depth ratio (that is, the first pixel height-to-depth ratio) at the moment $t_2$, parameter adjustment is performed on the second neural network by means of back propagation.

In this embodiment, the true value of the pixel height-to-depth ratio that is determined based on radar data at a same moment is used as supervision information for the second neural network. A parameter of the second neural network is adjusted reasonably based on the difference between the true value and the predicted value of the pixel height-to-depth ratio, thereby improving prediction accuracy of the second neural network.

FIG. 5 is a schematic flowchart after step S4 according to still another embodiment of this disclosure. As shown in FIG. 5, in this embodiment, after step S4, the following steps are further included.

S5', perform image reconstruction on the first image by using the homography matrix to obtain a first reconstructed image.

Specifically, image reconstruction is performed on the first image by using the homography matrix by means of reverse mapping, to obtain the first reconstructed image.

S6', adjust a matrix parameter of the homography matrix based on a pixel displacement of a road-surface element in a same area, which is between the first reconstructed image and the second image.

Specifically, if the matrix parameter of the homography matrix is optimal, the first reconstructed image is aligned with the second image in the road surface portion. If the matrix parameter of the homography matrix is not optimal, there may be a pixel displacement between the first reconstructed image and the second image in the road surface portion.

The matrix parameter of the homography matrix can be adjusted reasonably based on the pixel displacement of the road-surface element in the same area between the first reconstructed image and the second image.

S7', perform parameter adjustment on the road-surface subnetwork and the posture subnetwork based on the homography matrix whose matrix parameter is adjusted.

Specifically, the homography matrix is determined based on the road-surface normal information predicted by the road-surface subnetwork, the relative camera posture predicted by the posture subnetwork, and the pre-stored height of the camera relative to the road surface. Therefore, based on the homography matrix whose matrix parameter is adjusted, parameters of the road-surface subnetwork and the posture subnetwork can be reasonably adjusted by means of back propagation.

In this embodiment, the matrix parameter of the homography matrix can be reasonably adjusted based on the pixel displacement of the road-surface element in the same area, which is between the first reconstructed image and the second image. The homography matrix whose matrix parameter is adjusted is used as supervision information. Reasonably adjusting the parameters of the road-surface subnetwork and the posture subnetwork can improve prediction accuracy of the road-surface subnetwork and the posture subnetwork.

Figure 6:
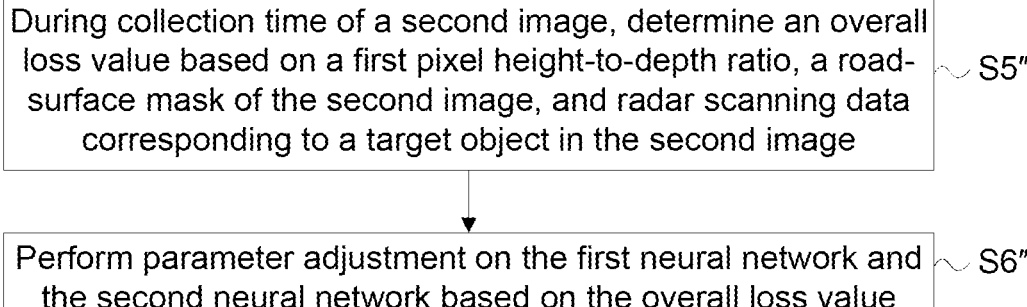
FIG. 6 is a schematic flowchart after step S4 according to yet another embodiment of this disclosure.

FIG. 6 is a schematic flowchart after step S4 according to yet another embodiment of this disclosure. As shown in FIG. 6, in this embodiment, after step S4, the following steps are further included.

S5", during collection time of the second image, determine an overall loss value based on the first pixel height-to-depth ratio, a road-surface mask of the second image, and radar scanning data corresponding to a target object in the second image.

Specifically, in this embodiment, the first neural network and the second neural network are taken as a whole. Based on the first pixel height-to-depth ratio and the road-surface mask of the second image, an overall photometric loss value can be calculated through a photometric loss function. A position of the target object in the second image relative to the vehicle and a volume of the target object can be obtained based on radar scanning data corresponding to the target object in the second image during the collection time of the second image, thereby helping to determine an overall supervised loss value. The overall loss value can be determined based on the overall photometric loss value and the supervised loss value.

S6", perform parameter adjustment on the first neural network and the second neural network based on the overall loss value.

In this embodiment, the first neural network and the second neural network are taken as a whole. By calculating the overall loss value, parameters of the first neural network and the second neural network can be adjusted reasonably, thereby improving prediction accuracy of the first neural network and the second neural network.

FIG. 7 is a schematic flowchart of step S5" according to an embodiment of this disclosure. As shown in FIG. 7, in this embodiment, step S5" includes the following steps.

S5"-1, determine a second pixel height-to-depth ratio of a target object based on radar scanning data corresponding to the target object in the second image.

Specifically, the vehicle is provided with an in-vehicle radar. A collection moment of the second image is $t_2$, and radar scanning data near the vehicle at the moment $t_2$ is obtained by using the in-vehicle radar. The second image and the radar scanning data near the vehicle are analyzed, so that the radar scanning data corresponding to the target object can be extracted from the radar scanning data near the vehicle based on an analysis result. A position of the target object relative to the vehicle and a volume of the target object can be accurately obtained based on the extracted radar scanning data, so that a true value of a pixel height-to-depth ratio at the moment $t_2$ can be generated, which is recorded as the second pixel height-to-depth ratio.

S5"-2, determine a first loss value based on the first pixel height-to-depth ratio and the second pixel height-to-depth ratio. The first loss value can be obtained by subtracting the first pixel height-to-depth ratio from the second pixel height-to-depth ratio.

S5"-3, perform image reconstruction on the first image by using the homography matrix to obtain a first reconstructed image.

Specifically, image reconstruction is performed on the first image by using the homography matrix by means of reverse mapping, to obtain the first reconstructed image.

S5"-4, determine a pixel displacement between a first image area and a second image area based on the first pixel height-to-depth ratio. The first image area is a remaining image area except a road-surface image area in the first reconstructed image, and the second image area is a remaining image area except a road-surface image area in the second image.

Specifically, the first reconstructed image is basically aligned with the second image in the road-surface image area based on the homography matrix (if a matrix parameter of the homography matrix is not optimal, there are still some pixels with displacement in the first reconstructed image and second image in the road surface portion). However, the first reconstructed image is not aligned with the second image in the remaining image area except the road-surface image area in the second image. Pixels in the remaining image areas except the road-surface image areas in the first reconstructed image and the second image are compared one by one to obtain the pixel displacement between the first image area and the second image area.

S5"-5, adjust a pixel position of the first reconstructed image based on the pixel displacement between the first image area and the second image area to obtain a second reconstructed image.

Specifically, the pixel position of the first reconstructed image is adjusted based on the pixel displacement between the first image area and the second image area, so that pixel alignment can be implemented between the second reconstructed image and the second image in the road-surface image area. In combination that the first reconstructed image is basically aligned with the second image in the road-surface image area, the second reconstructed image is basically aligned with the second image in an entire image.

S5"-6, determine a second loss value based on the second reconstructed image, the second image, and the road-surface mask of the second image.

Specifically, a photometric loss between the second reconstructed image and the second image can be calculated based on the second reconstructed image, the second image, and the road-surface mask of the second image, to serve as the second loss value.

S5"-7, determine the overall loss value based on the first loss value and the second loss value. The overall loss value can be obtained by adding the first loss value and the second loss value.

In this embodiment, during the collection time of the second image, the overall loss value can be reasonably determined based on the radar scanning data corresponding to the target object in the second image, the first pixel height-to-depth ratio, and the road-surface mask of the second image, so that parameters of the first neural network and the second neural network are reasonably adjusted based on the overall loss value, thereby improving prediction accuracy of the first neural network and the second neural network.

FIG. 8 is a schematic flowchart of step S5"-6 according to an embodiment of this disclosure. As shown in FIG. 8, in this embodiment, step S5"-6 includes the following steps.

S5"-6-1, determine an entire-image photometric error between the second reconstructed image and the second image.

In an optional manner, the entire-image photometric error is determined based on a photometric error function by using the following formulas:

$$L_p = \frac{\alpha}{2}(1 - SSIM(It, Isw)) + (1 - \alpha)|It - Isw|,$$

and

-continued $$L\_photo1 = L_p(It, Isw),$$

where $L_p$ represents a photometric loss coefficient; a represents a weight and is a constant; It represents the second image; Isw represents the second reconstructed image; SSIM(It, Isw) represents a structural similarity parameter between the second image and the second reconstructed image; and L_photo1 represents the entire-image photometric error.

S5"-6-2, determine photometric errors between the second reconstructed image and the second image in the road-surface image area based on the entire-image photometric error and the road-surface mask of the second image.

In an optional manner, the photometric errors between the second reconstructed image and the second image in the road-surface image area are determined according to the following formula:

$$L\_photo2 = mask\_ground * L\_photo1,$$

where L_photo2 represents the photometric errors between the second reconstructed image and the second image in the road-surface image area, and mask_ground represents the road-surface mask of the second image.

S5"-6-3, determine the second loss value based on the entire-image photometric error and the photometric errors between the second reconstructed image and the second image in the road-surface image area.

Specifically, the second loss value is determined according to the following formula:

$$L\_photoT = Lphoto1 + L\_photo2.$$

In this embodiment, the second loss value between the second reconstructed image and the second image can be reasonably determined based on the second reconstructed image, the second image, and the road-surface mask of the second image, so that parameters of the first neural network and the second neural network are reasonably adjusted based on the second loss value, thereby improving prediction accuracy of the first neural network and the second neural network.

Any image data processing method provided in the embodiments of this disclosure can be implemented by any suitable device with a data processing capability, including but not limited to a terminal device and a server. Alternatively, any image data processing method provided in the embodiments of this disclosure can be implemented by a processor. For example, the processor implements any image data processing method described in the embodiments of this disclosure by invoking corresponding instructions stored in a memory. Details are not described below again.

Exemplary Apparatus

FIG. 9 is a structural block diagram of an image data processing apparatus according to an embodiment of this disclosure. As shown in FIG. 9, in this embodiment, the image data processing apparatus includes a homography matrix determining module 100, a mapped image feature determining module 200, a fusion module 300, and a first pixel height-to-depth ratio determining module 400.

The homography matrix determining module 100 is configured to process a first image and a second image by using a first neural network to obtain a homography matrix, where the first image is captured at a first moment, the second image is captured at a second moment, and the first image and the second image have road-surface elements in a same area. The mapped image feature determining module 200 is configured to determine a mapped image feature of a first image feature based on the homography matrix, where the first image feature is a feature extracted based on the first image. The fusion module 300 is configured to fuse the mapped image feature and a second image feature to obtain a fused image feature, where the second image feature is a feature extracted based on the second image. The first pixel height-to-depth ratio determining module 400 is configured to process the fused image feature by using a second neural network to obtain a first pixel height-to-depth ratio of the second image.

FIG. 10 is a structural block diagram of a homography matrix determining module 100 according to an embodiment of this disclosure. As shown in FIG. 10, in this embodiment, the homography matrix determining module 100 includes:

a fusion unit 101, configured to fuse the first image feature and the second image feature to obtain a third image feature;

a road-surface normal information determining unit 102, configured to process the third image feature by using a road-surface subnetwork in the first neural network to determine road-surface normal information;

a relative camera posture determining unit 103, configured to process the third image feature by using a posture subnetwork in the first neural network to determine a relative camera posture between the first image and the second image; and a homography matrix determining unit 104, configured to determine the homography matrix based on the road-surface normal information, the relative camera posture, and a pre-stored height of a camera relative to a road surface.

Figure 11:
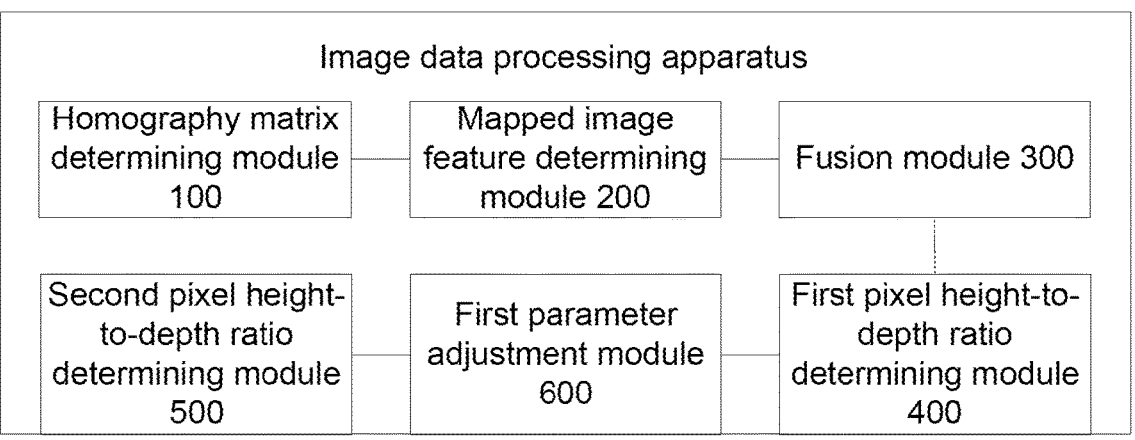
FIG. 11 is a structural block diagram of an image data processing apparatus according to another embodiment of this disclosure.

FIG. 11 is a structural block diagram of an image data processing apparatus according to another embodiment of this disclosure. As shown in FIG. 11, in this embodiment, the image data processing apparatus further includes:

a second pixel height-to-depth ratio determining module 500, configured to determine, during collection time of the second image, a second pixel height-to-depth ratio of a target object based on radar scanning data corresponding to the target object in the second image; and a first parameter adjustment module 600, configured to perform parameter adjustment on the second neural network based on a difference between the first pixel height-to-depth ratio and the second pixel height-to-depth ratio.

Figure 12:
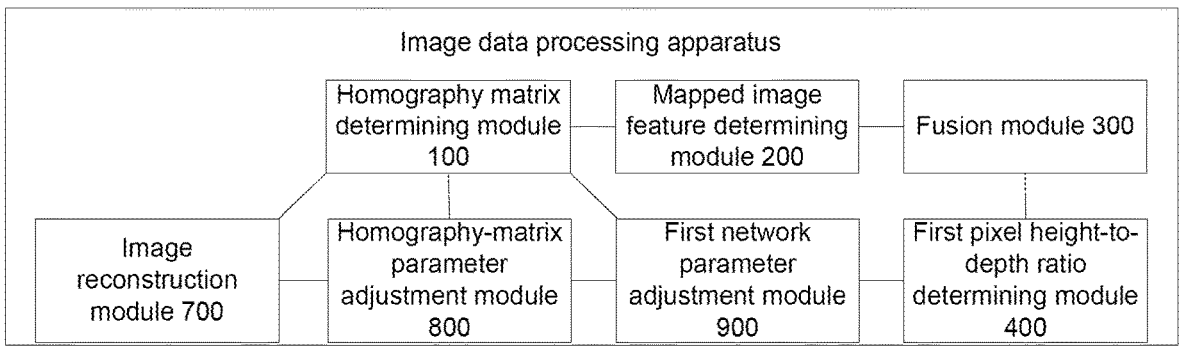
FIG. 12 is a structural block diagram of an image data processing apparatus according to still another embodiment of this disclosure.

FIG. 12 is a structural block diagram of an image data processing apparatus according to still another embodiment of this disclosure. As shown in FIG. 12, in this embodiment, the image data processing apparatus further includes:

an image reconstruction module 700, configured to perform image reconstruction on the first image by using the homography matrix to obtain a first reconstructed image;

a homography-matrix parameter adjustment module 800, configured to adjust a matrix parameter of the homography matrix based on a pixel displacement between the first reconstructed image and the second image in the road-surface element within the same area; and a first network parameter adjustment module 900, configured to perform parameter adjustment on the road-surface subnetwork and the posture subnetwork based on the homography matrix whose matrix parameter is adjusted.

Figure 13:
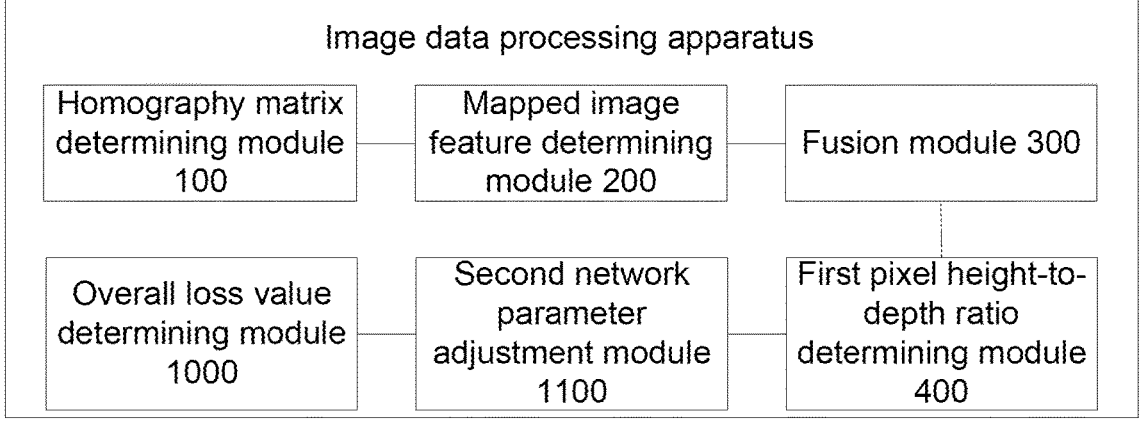
FIG. 13 is a structural block diagram of an image data processing apparatus according to yet another embodiment of this disclosure.

FIG. 13 is a structural block diagram of an image data processing apparatus according to yet another embodiment of this disclosure. As shown in FIG. 13, in this embodiment, the image data processing apparatus further includes:

an overall loss value determining module 1000, configured to determine, during collection time of the second image, an overall loss value based on the first pixel height-to-depth ratio, a road-surface mask of the second image, and radar scanning data corresponding to a target object in the second image; and a second network parameter adjustment module 1100, configured to perform parameter adjustment on the first neural network and the second neural network based on the overall loss value.

Figure 14:
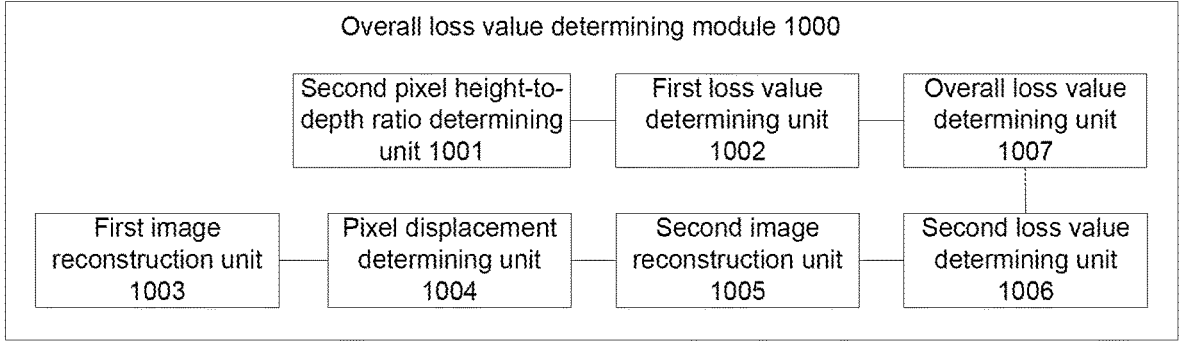
FIG. 14 is a structural block diagram of an overall loss value determining module 1000 according to an embodiment of this disclosure.

FIG. 14 is a structural block diagram of an overall loss value determining module 1000 according to an embodiment of this disclosure. As shown in FIG. 14, in this embodiment, the overall loss value determining module 1000 includes:

a second pixel height-to-depth ratio determining unit 1001, configured to determine a second pixel height-to-depth ratio of the target object based on the radar scanning data;

a first loss value determining unit 1002, configured to determine a first loss value based on the first pixel height-to-depth ratio and the second pixel height-to-depth ratio;

a first image reconstruction unit 1003, configured to perform image reconstruction on the first image by using the homography matrix to obtain a first reconstructed image;

a pixel displacement determining unit 1004, configured to determine a pixel displacement between a first image area and a second image area based on the first pixel height-to-depth ratio, where the first image area is a remaining image area except a road-surface image area in the first reconstructed image, and the second image area is a remaining image area except a road-surface image area in the second image;

a second image reconstruction unit 1005, configured to adjust a pixel position of the first reconstructed image based on the pixel displacement to obtain a second reconstructed image;

a second loss value determining unit 1006, configured to determine a second loss value based on the second reconstructed image, the second image, and the road-surface mask of the second image; and an overall loss value determining unit 1007, configured to determine the overall loss value based on the first loss value and the second loss value.

In an embodiment of this disclosure, the second loss value determining unit 1006 is specifically configured to determine an entire-image photometric error between the second reconstructed image and the second image. The second loss value determining unit 1006 is further configured to determine photometric errors between the second reconstructed image and the second image in the road-surface image area based on the entire-image photometric error and the road-surface mask of the second image. The second loss value determining unit 1006 is further configured to determine the second loss value based on the entire-image photometric error and the photometric errors between the second reconstructed image and the second image in the road-surface image area.

It should be noted that the specific implementations of the image data processing apparatus in the embodiments of this disclosure are similar to the specific implementations of the image data processing method in the embodiments of this disclosure. For details, reference can be made to the section of the image data processing method. To reduce redundancy, details are not described again.

Exemplary Electronic Device

Figure 15:
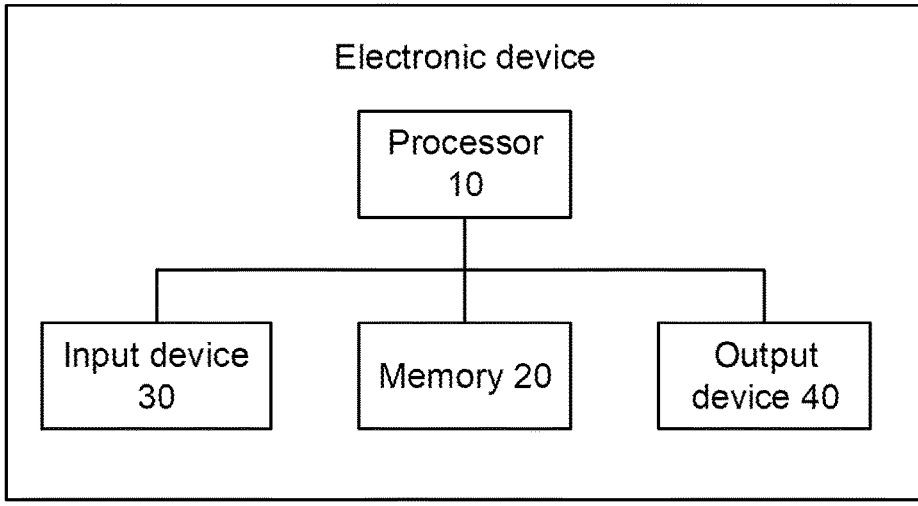
FIG. 15 is a structural diagram of an electronic device according to an embodiment of this disclosure.

An electronic device according to an embodiment of this disclosure is described below with reference to FIG. 15. As shown in FIG. 15, the electronic device includes one or more processors 10 and a memory 20.

The processor 10 may be a central processing unit (CPU) or other forms of processing unit having a data processing capability and/or an instruction execution capability, and can control other components in the electronic device to perform a desired function.

The memory 20 can include one or more computer program products. The computer program product can include various forms of computer readable storage media, such as a volatile memory and/or a non-volatile memory. The volatile memory can include, for example, a random access memory (RAM) and/or a cache. The nonvolatile memory can include, for example, a read-only memory (ROM), a hard disk, and a flash memory. One or more computer program instructions can be stored on the computer readable storage medium. The processor 10 can execute the program instructions to implement the image data processing method according to various embodiments of this disclosure that are described above and/or other desired functions. Various contents such as an input signal, a signal component, and a noise component can also be stored in the computer readable storage medium.

In an example, the electronic device can further include an input device 30 and an output device 40. These components are connected with each other through a bus system and/or other forms of connection mechanisms (not shown). The input device 30 can be a keyboard or a mouse. The output device 40 can include, for example, a display, a loudspeaker, a printer, a communication network, and a remote output device connected by the communication network.

Certainly, for simplicity, FIG. 15 shows only some of components in the electronic device that are related to this disclosure, and components such as a bus and an input/output interface are omitted. In addition, according to specific application situations, the electronic device can further include any other appropriate components.

Exemplary Computer Readable Storage Medium

The computer readable storage medium may be one readable medium or any combination of a plurality of readable media. The readable medium may be a readable signal medium or a readable storage medium. The readable storage medium can include, for example, but is not limited to a system, an apparatus, or a device of electricity, magnetism, light, electromagnetism, infrared ray, or semiconductor, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, it should be pointed out that the advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

The various embodiments in this specification are all described in a progressive way, and each embodiment focuses on a difference from other embodiments. For same or similar parts among the various embodiments, reference can be made to each other. The system embodiments basically correspond to the method embodiments, and thus are relatively simply described. For related parts, reference can be made to a part of the descriptions of the method embodiments.

The block diagrams of the equipment, the apparatus, the device, and the system involved in this disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system can be connected, arranged, and configured in an arbitrary manner. The terms such as "include", "contain", and "have" are open terms that mean "including but not limited to", and can be used interchangeably with "including but not limited to". The terms "or" and "and" used herein refer to the term "and/or", and can be used interchangeably with "and/or", unless the context clearly indicates otherwise. The term "such as" used herein refers to the phrase "such as but not limited to", and can be used interchangeably with "such as but not limited to".

The method and the apparatus in this disclosure can be implemented in many ways. For example, the method and the apparatus in this disclosure can be implemented by software, hardware, firmware, or any combination of the software, the hardware, and the firmware. The foregoing sequence of the steps of the method is for illustration only, and the steps of the method in this disclosure are not limited to the sequence specifically described above, unless otherwise specifically stated in any other manner. In addition, in some embodiments, this disclosure can also be implemented as programs recorded in a recording medium. These programs include machine-readable instructions for implementing the method according to this disclosure. Therefore, this disclosure further relates to a recording medium storing a program for implementing the method according to this disclosure.

It should be further pointed out that, various components or various steps in the apparatus, the device, and the method of this disclosure can be disassembled and/or recombined. These disassembling and/or recombinations shall be regarded as equivalent solutions of this disclosure.

The foregoing description about the disclosed aspects is provided, so that this disclosure can be arrived at or carried out by any person skilled in the art. Various modifications to these aspects are very obvious to a person skilled in the art. Moreover, general principles defined herein can be applicable to other aspects without departing from the scope of this disclosure. Therefore, this disclosure is not intended to be limited to the aspects illustrated herein, but to the widest scope consistent with the principles and novel features disclosed herein.

The foregoing descriptions are given for illustration and description. In addition, the description is not intended to limit the embodiments of this disclosure to forms disclosed herein. Although a plurality of exemplary aspects and embodiments have been discussed above, a person skilled in the art may recognize certain variations, modifications, changes, additions, and sub-combinations thereof.

What is claimed is:

1. An image data processing method, comprising:

processing a first image and a second image by using a first neural network to obtain a homography matrix, wherein the first image is captured at a first moment, the second image is captured at a second moment, and the first image and the second image have road-surface elements in a same area;

determining a mapped image feature of a first image feature based on the homography matrix, wherein the first image feature is a feature extracted based on the first image;

fusing the mapped image feature and a second image feature to obtain a fused image feature, wherein the second image feature is a feature extracted based on the second image; and processing the fused image feature by using a second neural network to obtain a first pixel height-to-depth ratio of the second image.

2. The image data processing method according to claim 1, wherein the processing the first image and the second image by using the first neural network to obtain the homography matrix comprises:

fusing the first image feature of the first image and the second image feature of the second image to obtain a third image feature;

processing the third image feature by using a road-surface subnetwork in the first neural network to determine road-surface normal information;

processing the third image feature by using a posture subnetwork in the first neural network to determine a relative camera posture between the first image and the second image; and determining the homography matrix based on the road-surface normal information, the relative camera posture, and a pre-stored height of a camera relative to a road surface.

3. The image data processing method according to claim 2, wherein after the processing the first image and the second image by using the first neural network to obtain the homography matrix, the method further comprises:

performing image reconstruction on the first image by using the homography matrix to obtain a first reconstructed image;

adjusting a matrix parameter of the homography matrix based on a pixel displacement of the road-surface elements in the same area, which is between the first reconstructed image and the second image; and performing parameter adjustment on the road-surface subnetwork and the posture subnetwork based on the homography matrix whose matrix parameter is adjusted.

4. The image data processing method according to claim 1, wherein after the processing the fused image feature by using the second neural network to obtain the first pixel height-to-depth ratio of the second image, the method further comprises:

during collection time of the second image, determining a second pixel height-to-depth ratio of a target object in the second image based on radar scanning data corresponding to the target object in the second image; and performing parameter adjustment on the second neural network based on a difference between the first pixel height-to-depth ratio and the second pixel height-to-depth ratio.

5. The image data processing method according to claim 1, wherein after the processing the fused image feature by using the second neural network to obtain the first pixel height-to-depth ratio of the second image, the method further comprises:

during collection time of the second image, determining an overall loss value based on the first pixel height-to-depth ratio, a road-surface mask of the second image, and radar scanning data corresponding to a target object in the second image; and performing parameter adjustment on the first neural network and the second neural network based on the overall loss value.

6. The image data processing method according to claim 5, wherein the during collection time of the second image, determining the overall loss value based on the first pixel height-to-depth ratio, the road-surface mask of the second image, and the radar scanning data corresponding to the target object in the second image comprises:

determining a second pixel height-to-depth ratio of the target object based on the radar scanning data;

determining a first loss value based on the first pixel height-to-depth ratio and the second pixel height-to-depth ratio;

performing image reconstruction on the first image by using the homography matrix to obtain a first reconstructed image;

determining a pixel displacement between a first image area and a second image area based on the first pixel height-to-depth ratio, wherein the first image area is a remaining image area except a road-surface image area in the first reconstructed image, and the second image area is a remaining image area except a road-surface image area in the second image;

adjusting a pixel position of the first reconstructed image based on the pixel displacement to obtain a second reconstructed image;

determining a second loss value based on the second reconstructed image, the second image, and the road-surface mask of the second image; and determining the overall loss value based on the first loss value and the second loss value.

7. The image data processing method according to claim 6, wherein the determining the second loss value based on the second reconstructed image, the second image, and the road-surface mask of the second image comprises:

determining an entire-image photometric error between the second reconstructed image and the second image;

determining photometric errors between the second reconstructed image and the second image in the road-surface image area based on the entire-image photometric error and the road-surface mask of the second image; and determining the second loss value based on the entire-image photometric error and the photometric errors between the second reconstructed image and the second image in the road-surface image area.

8. A non-transitory computer readable storage medium, wherein the computer readable storage medium stores a computer program, and the computer program is used for implementing an image data processing method, wherein the image data processing method comprises:

processing a first image and a second image by using a first neural network to obtain a homography matrix, wherein the first image is captured at a first moment, the second image is captured at a second moment, and the first image and the second image have road-surface elements in a same area;

determining a mapped image feature of a first image feature based on the homography matrix, wherein the first image feature is a feature extracted based on the first image;

fusing the mapped image feature and a second image feature to obtain a fused image feature, wherein the second image feature is a feature extracted based on the second image; and processing the fused image feature by using a second neural network to obtain a first pixel height-to-depth ratio of the second image.

9. The non-transitory computer readable storage medium according to claim 8, wherein the processing the first image and the second image by using the first neural network to obtain the homography matrix comprises:

fusing the first image feature of the first image and the second image feature of the second image to obtain a third image feature;

processing the third image feature by using a road-surface subnetwork in the first neural network to determine road-surface normal information;

processing the third image feature by using a posture subnetwork in the first neural network to determine a relative camera posture between the first image and the second image; and determining the homography matrix based on the road-surface normal information, the relative camera posture, and a pre-stored height of a camera relative to a road surface.

10. The non-transitory computer readable storage medium according to claim 9, wherein after the processing the first image and the second image by using the first neural network to obtain the homography matrix, the method further comprises:

performing image reconstruction on the first image by using the homography matrix to obtain a first reconstructed image;

adjusting a matrix parameter of the homography matrix based on a pixel displacement of the road-surface elements in the same area, which is between the first reconstructed image and the second image; and performing parameter adjustment on the road-surface subnetwork and the posture subnetwork based on the homography matrix whose matrix parameter is adjusted.

11. The non-transitory computer readable storage medium according to claim 8, wherein after the processing the fused image feature by using the second neural network to obtain the first pixel height-to-depth ratio of the second image, the method further comprises:

during collection time of the second image, determining a second pixel height-to-depth ratio of a target object in the second image based on radar scanning data corresponding to the target object in the second image; and performing parameter adjustment on the second neural network based on a difference between the first pixel height-to-depth ratio and the second pixel height-to-depth ratio.

12. The non-transitory computer readable storage medium according to claim 8, wherein after the processing the fused image feature by using the second neural network to obtain the first pixel height-to-depth ratio of the second image, the method further comprises:

during collection time of the second image, determining an overall loss value based on the first pixel height-to-depth ratio, a road-surface mask of the second image, and radar scanning data corresponding to a target object in the second image; and performing parameter adjustment on the first neural network and the second neural network based on the overall loss value.

13. The non-transitory computer readable storage medium according to claim 12, wherein the during collection time of the second image, determining the overall loss value based on the first pixel height-to-depth ratio, the road-surface mask of the second image, and the radar scanning data corresponding to the target object in the second image comprises:

determining a second pixel height-to-depth ratio of the target object based on the radar scanning data;

determining a first loss value based on the first pixel height-to-depth ratio and the second pixel height-to-depth ratio;

performing image reconstruction on the first image by using the homography matrix to obtain a first reconstructed image;

determining a pixel displacement between a first image area and a second image area based on the first pixel height-to-depth ratio, wherein the first image area is a remaining image area except a road-surface image area in the first reconstructed image, and the second image area is a remaining image area except a road-surface image area in the second image;

adjusting a pixel position of the first reconstructed image based on the pixel displacement to obtain a second reconstructed image;

determining a second loss value based on the second reconstructed image, the second image, and the road-surface mask of the second image; and determining the overall loss value based on the first loss value and the second loss value.

14. The non-transitory computer readable storage medium according to claim 13, wherein the determining the second loss value based on the second reconstructed image, the second image, and the road-surface mask of the second image comprises:

determining an entire-image photometric error between the second reconstructed image and the second image;

determining photometric errors between the second reconstructed image and the second image in the road-surface image area based on the entire-image photometric error and the road-surface mask of the second image; and determining the second loss value based on the entire-image photometric error and the photometric errors between the second reconstructed image and the second image in the road-surface image area.

15. An electronic device, wherein the electronic device comprises:

a processor; and a memory, configured to store processor-executable instructions, wherein the processor is configured to read the executable instructions from the memory, and execute the instructions to implement an image data processing method, wherein the image data processing method comprises:

processing a first image and a second image by using a first neural network to obtain a homography matrix, wherein the first image is captured at a first moment, the second image is captured at a second moment, and the first image and the second image have road-surface elements in a same area;

determining a mapped image feature of a first image feature based on the homography matrix, wherein the first image feature is a feature extracted based on the first image;

fusing the mapped image feature and a second image feature to obtain a fused image feature, wherein the second image feature is a feature extracted based on the second image; and processing the fused image feature by using a second neural network to obtain a first pixel height-to-depth ratio of the second image.

16. The electronic device according to claim 15, wherein the processing the first image and the second image by using the first neural network to obtain the homography matrix comprises:

fusing the first image feature of the first image and the second image feature of the second image to obtain a third image feature;

processing the third image feature by using a road-surface subnetwork in the first neural network to determine road-surface normal information;

processing the third image feature by using a posture subnetwork in the first neural network to determine a relative camera posture between the first image and the second image; and determining the homography matrix based on the road-surface normal information, the relative camera posture, and a pre-stored height of a camera relative to a road surface.

17. The electronic device according to claim 16, wherein after the processing the first image and the second image by using the first neural network to obtain the homography matrix, the method further comprises:

performing image reconstruction on the first image by using the homography matrix to obtain a first reconstructed image;

adjusting a matrix parameter of the homography matrix based on a pixel displacement of the road-surface elements in the same area, which is between the first reconstructed image and the second image; and performing parameter adjustment on the road-surface subnetwork and the posture subnetwork based on the homography matrix whose matrix parameter is adjusted.

18. The electronic device according to claim 15, wherein after the processing the fused image feature by using the second neural network to obtain the first pixel height-to-depth ratio of the second image, the method further comprises:

during collection time of the second image, determining a second pixel height-to-depth ratio of a target object in the second image based on radar scanning data corresponding to the target object in the second image; and performing parameter adjustment on the second neural network based on a difference between the first pixel height-to-depth ratio and the second pixel height-to-depth ratio.

19. The electronic device according to claim 15, wherein after the processing the fused image feature by using the second neural network to obtain the first pixel height-to-depth ratio of the second image further, the method further comprises:

during collection time of the second image, determining an overall loss value based on the first pixel height-to-depth ratio, a road-surface mask of the second image, and radar scanning data corresponding to a target object in the second image; and performing parameter adjustment on the first neural network and the second neural network based on the overall loss value.

20. The electronic device according to claim 19, wherein the during collection time of the second image, determining the overall loss value based on the first pixel height-to-depth ratio, the road-surface mask of the second image, and the radar scanning data corresponding to the target object in the second image comprises:

determining a second pixel height-to-depth ratio of the target object based on the radar scanning data;

determining a first loss value based on the first pixel height-to-depth ratio and the second pixel height-to-depth ratio;

performing image reconstruction on the first image by using the homography matrix to obtain a first reconstructed image;

determining a pixel displacement between a first image area and a second image area based on the first pixel height-to-depth ratio, wherein the first image area is a remaining image area except a road-surface image area in the first reconstructed image, and the second image area is a remaining image area except a road-surface image area in the second image;

adjusting a pixel position of the first reconstructed image based on the pixel displacement to obtain a second reconstructed image;

determining a second loss value based on the second reconstructed image, the second image, and the road-surface mask of the second image; and determining the overall loss value based on the first loss value and the second loss value.

* * * * *